United States Patent [19]

Weiss

[11] Patent Number: 4,477,421

[45] Date of Patent: Oct. 16, 1984

[54] PROCESS FOR THE STABILIZATION OF AQUEOUS CYANAMIDE SOLUTIONS

[75] Inventor: Stefan Weiss, Trostberg, Fed. Rep. of Germany

[73] Assignee: SKW Trostberg Aktiengesellschaft, Trostberg, Fed. Rep. of Germany

[21] Appl. No.: 493,385

[22] Filed: May 10, 1983

[30] Foreign Application Priority Data

May 21, 1982 [DE] Fed. Rep. of Germany ....... 3219054

[51] Int. Cl.$^3$ .............................................. C01C 3/18
[52] U.S. Cl. ..................................... 423/275; 423/368
[58] Field of Search ........................ 423/378, 275, 368

[56] References Cited

FOREIGN PATENT DOCUMENTS

| 2642023 | 3/1978 | Fed. Rep. of Germany | 423/368 |
| 150105 | 11/1962 | U.S.S.R. | 423/368 |
| 274106 | 9/1970 | U.S.S.R. | 423/368 |
| 295398 | 3/1972 | U.S.S.R. | 423/368 |

*Primary Examiner*—John Doll
*Assistant Examiner*—Wayne A. Langel
*Attorney, Agent, or Firm*—Felfe & Lynch

[57] ABSTRACT

The present invention provides a process for increasing the storage stability of an aqueous solution containing 20 to 80% by weight cyanamide, wherein the aqueous cyanamide solution is mixed with 0.005 to 0.5% by weight of divalent magnesium cations, referred to the cyanamide solution, in the form of at least one inorganic and/or organic magnesium salt.

10 Claims, No Drawings

PROCESS FOR THE STABILIZATION OF AQUEOUS CYANAMIDE SOLUTIONS

The present invention is concerned with a process for the stabilisation of aqueous cyanamide solutions containing 20 to 80% by weight of cyanamide and especially of technical, commercially-available cyanamide solutions.

Aqueous cyanamide solutions, and especially those containing about 50% by weight of cyanamide composition, are used not only as inexpensive starting material for the production of important plant protection agents technical preservation agents, disinfection agents and pharmaceuticals but also directly as agrochemicals.

However, it is known that cyanamide solutions, upon storage, are unstable, especially at storage temperatures above 20° C. In the range below pH 3 and above pH 12, urea is thereby formed, whereas from pH 8 and preferably at pH 9.0 to 10.0, dimerisation to give dicyandiamide preponderates. Aqueous cyanamide solutions are the most stable within the pH range of from 3 to 5, for which reason commercially available, already stabilised solutions have a pH of about 4 to 4.5. At storage temperatures of from 10° to 20° C., these commercially available cyanamide solutions are stable for approaching 6 months before the cyanamide content thereof decreases noticeably with dimerisation to give dicyandiamide. These limits are technically not satisfactory not only with regard to the temperature range but also to the period of time of working up.

Aqueous cyanamide solutions are known which are stabilised with ethylene glycol diacetate but, in order to achieve a high storage stability of the cyanamide solution, large amounts of ester must be added (see U.S. Pat. No. 3,295,926).

According to Federal Republic of Germany Patent Specification No. 26 42 023, the storage stability of aqueous cyanamide solutions can be quite considerably improved by the addition of small amounts of a carboxylic acid ester which is derived from an aliphatic carboxylic acid with a 25° C. value of 3.8 or below.

However, the use of carboxylic acid esters for the stabilisation of aqueous cyanamide solutions has the disadvantage that the carboxylic acid esters and especially the formic acid esters are low boiling point, volatile and readily inflammable liquids. Furthermore, the preferably used propyl formate is comparatively expensive since it cannot be produced on a large scale.

Furthermore, the aqueous cyanamide solutions which are to be used as plant treating agents, for example for combating weeds in onion crops and amongst vegetables, should only contain those stabiliser additives which can be utilised by the cultivated plants as nutriments. When cyanamide is taken up by the plants, it is converted into forms of nitrogen which are available to the plants, and, therefore, cyanamide, when used as an agrochemical, does not leave behind any harmful residues.

Consequently, it is an object of the present invention to provide an improved process, which is as cheap as possible, for the stabilisation of aqueous cyanamide solutions and especially of technical 50% by weight cyanamide solutions, imparting a good storage stability even under extreme storage conditions over comparatively long periods of time.

Surprisingly, we have now found that magnesium salts are suitable for increasing the storage stability of aqueous cyanamide solutions.

Thus, according to the present invention, there is provided a process for increasing the storage stability of an aqueous solution containing 20 to 80% by weight cyanamide, wherein the aqueous cyanamide solution is mixed with 0.005 to 0.5% by weight of divalent magnesium cations, referred to the cyanamide solution, in the form of at least one inorganic and/or organic magnesium salt.

In particular, the storage stability of technical approximately 50% by weight cyanamide solutions can be quite considerably improved by means of the process according to the present invention, for which purpose, as a rule, additions of 0.04 to 0.06% by weight of divalent magnesium ions, corresponding to 0.3 to 0.5% by weight of magnesium chloride hexahydrate or to 0.4 to 0.6% by weight of magnesium sulphate heptahydrate, are necessary.

By means of the addition according to the present invention of, for example 0.3 to 0.5% by weight magnesium chloride hexahydrate (0.036 to 0.06% by weight of divalent magnesium ions) or of 0.4 to 0.6% by weight of magnesium sulphate heptahydrate (0.039 to 0.059% by weight of divalent magnesium ions) to technical approximately 50% by weight aqueous cyanamide solutions, a storage stability can be achieved which is even better than the stabilisation achieved with formic acid esters.

The fact that magnesium salts, when added in amounts of from 0.005 to 0.5% by weight of divalent magnesium ions, can be used in an outstanding manner for the stabilisation of aqueous cyanamide solutions, especially of technical cyanamide solutions, is very surprising and could not have been expected on the basis of the present knowledge regarding the behaviour of cyanamide in aqueous solutions, according to which the stability of aqueous cyanamide solutions is reduced by the presence of metal ions. Thus, in the case of the disclosures in U.S. Pat. No. 2,982,616 and in Canadian Patent Specification No. 1,080,150, dilute technical aqueous cyanamide solutions are, before concentration thereof, treated with an ion exchanger ("Amberlite" IRC-50) for the removal of calcium ions in order to increase the safety in the case of vacuum evaporation.

It is of importance for the present invention that even small amounts of divalent magnesium ions, i.e. about 0.04 to 0.06% by weight (=400 to 600 ppm) are sufficiently effective. The optimum amount to be added depends upon the concentration and the pretreatment of the cyanamide solution, as well as upon the given storage temperatures and is to be determined by preliminary experiments.

Magnesium salts are cheap, non-volatile, noninflammable and non-toxic substances. Magnesium is also an important micronutrient for plants. For the stabilisation of aqueous cyanamide solutions according to the present invention, the magnesium ions can be added in the form of inorganic salts, preferably of magnesium chloride hexahydrate or of magnesium sulphate heptahydrate, or also in the form of organic salts, for example as magnesium acetate or formate. However, besides individual magnesium salts, mixtures of different magnesium salts can also be used, in which case small synergistic stabilising effects can also be achieved.

For the stabilisation of technical, commercially available cyanamide solutions, the appropriate magnesium salts can be added to cyanamide solutions which have already been concentrated to a cyanamide content of about 50% by weight. In contradistinction to the stabilisation with volatile carboxylic acid esters, however, the magnesium salt stabiliser can also already be added to the dilute solutions before concentration thereof in a vacuum, the safety during vacuum evaporation of the dilute technical cyanamide solutions thereby being increased.

According to the present invention, the cyanamide solutions stabilised with magnesium salts should, after the addition of the appropriate magnesium salts, have a pH value at 20° C. of from about 5 to 3 and preferably a pH value of 3.5 to 4.5, the pH value being measured with a calibrated, commercially available glass electrode. If necessary, the adjustment of the pH value to about 5 to 3 and preferably to a pH value of from 3.5 to 4.5, can be carried out with a mineral acid, for example with phosphoric acid, and/or with an organic acid. Of course, it is also possible to proceed in such a manner that, before the addition of the stabilisers used according to the present invention, a pH value of about 3.8 to 4.5 is adjusted with an inorganic or organic acid and preferably with dilute phosphoric acid, whereafter the appropriate magnesium salts are added, a subsequent correction of the pH value generally being unnecessary.

Due to the addition, according to the present invention, of from 0.005 to 0.5% by weight of magnesium ions, the cyanamide solutions are scarcely contaminated. The removal of the magnesium salt stabiliser, which, in contradistinction to the carboxylic acid esters, is not volatile, need normally not be carried out when the cyanamide solutions are further worked up or used.

A further advantage of the present invention is the fact that technical approximately 50% by weight cyanamide solutions can be stabilised more effectively than heretofore. Due to the stabilisation according to the present invention of technical cyanamide solutions with magnesium salts, the safety not only during transport and storage but also during handling of commercially available approximately 50% by weight cyanamide solutions is further increased.

The following Examples are given for the purpose of illustrating the present invention; all the percentages given therein are by weight and all the statements of the amounts of the added materials refer to the aqueous cyanamide solutions:

EXAMPLE 1

The storage stability of 50% by weight aqueous technical commercially-available cyanamide solution at 20° and 30° C. can, in comparison with the stabilisation with n-propyl formate, be still further improved by the addition of magnesium salts, for example of magnesium chloride or nitrate, as shown in the following Table 1.

EXAMPLE 2

The stability of 50% by weight aqueous commercially-available cyanamide solutions, for example at a storage temperature of 30° C., is quite considerably improved by the addition of 0.4% magnesium chloride hexahydrate (=0.19% magnesium chloride) or of 0.4% magnesium sulphate heptahydrate (=0.2% magnesium sulphate), a storage stability thereby being obtained which is even greater than that obtained with n-propyl formate. The results obtained are shown in the following Table 2.

EXAMPLE 3

Even in the case of elevated storage temperatures of, for example, 40° C., the storage stability of 50% by weight aqueous technical cyanamide solutions, which are used in this form as starting materials for the preparation of plant protection agents, technical preserving agents, disinfection agents and pharmaceuticals, as well as as agrochemicals, is still further increased in comparison with the stabilisation with n-propyl formate, by the addition of magnesium salts, for example of magnesium chloride, nitrate and sulphate. Mixtures of different magnesium salts can also be used, which can result in a synergistic increase of action (see the following Table 3).

EXAMPLE 4

The following Table 4 shows the considerably improved storage stability of aqueous technical commercially-available cyanamide solutions obtained by the addition of magnesium chloride at a pH value of 3.5, which has been adjusted with dilute hydrochloric acid.

EXAMPLE 5

The storage stability of aqueous cyanamide solutions, which have been produced by the concentration of a 30% by weight aqueous technical cyanamide solution, with and without the addition of magnesium chloride, on a rotary evaporator at 35° C. under water-pump vacuum, is investigated at a storage temperature of 30° and 40° C. From the following Table 5, it follows that the solutions with 0.24% by weight magnesium chloride, which has been added before the concentration in the form of magnesium chloride hexahydrate, are considerably more stable at 30° and 40° C. than cyanamide solutions produced without the addition of magnesium chloride.

EXAMPLE 6

Storage stability experiments were carried out at 30° and 40° C. with a 78% by weight aqueous cyanamide solution which has been prepared by dissolving technically pure cyanamide in water and subsequently mixed with 0.2% by weight magnesium chloride hexahydrate (=0.094% magnesium chloride) or with 0.25% n-propyl formate. The pH value was adjusted with dilute phosphoric acid to 3.8. The results obtained are set out in the following Table 6.

TABLE 1

Improvement of the storage stability of 50% aqueous technical commercially available cyanamide solutions at 20 and 30° C. storage temperature by the addition of magnesium chloride or nitrate, in comparison with the stabilisation with n-propyl formate (prior art); pH value of the storage samples before commencement of storage = 4.2

50% aqueous technical cyanamide solution (commercially available) (content of this solution before commencement of storage 50.0%; adjustment of the pH value took place with dilute phosphoric acid)

| without addn. (orig. soln.) pH 4.2 | with addn. of 0.25% n-propyl formate pH 4.2 | with addn. of 0.125% $MgCl_2.6H_2O$ (= 0.015% $Mg^{++}$) pH 4.2 | with addn. of 0.25% $MgCl_2.6H_2O$ (= 0.03% $Mg^{++}$) pH 4.2 | with addn. of 0.5% $MgCl_2.6H_2O$ (= 0.06% $Mg^{++}$) pH 4.2 | with addn. of 0.25% $Mg(NO_3)_2.6H_2O$ (= 0.024% $Mg^{++}$) pH 4.2 |
|---|---|---|---|---|---|
| | cyanamide content after a storage period of 360 days at 20° C. | | | | |
| 44.6% | 47.0% | 47.7% | 48.3% | 48.3% | 48.1% |
| | cyanamide content after a storage period of 120 days at 30° C. | | | | |
| <35% | 45.1% | 44.6% | 46.7% | 47.3% | 45.5% |

TABLE 2

Improvement of the stability of 50% aqueous technical commercially available cyanamide solutions at a storage temperature of 30° C. by addition of 0.4% $MgCl_2.6H_2O$ (= 0.19% $MgCl_2$) or of 0.4% $MgSO_4.7H_2O$ (= 0.2% $MgSO_4$) in comparison with stabilisation of 0.25% n-propyl formate; pH value of the storage samples before commencement of storage = 4.0

50% aqueous technical commercial cyanamide solution; at commencement of storage, pH adjusted to 4.0 with phosphoric acid

| | without addn. (original solution) | with addn. of 0.25% n-propyl formate | with addn. of 0.4% $MgCl_2.6H_2O$ (= 0.048% $Mg^{++}$) | with addn. of 0.4% $MgSO_4.7H_2O$ (= 0.039% $Mg^{++}$) |
|---|---|---|---|---|
| cyanamide content after storage time at 30° C. of | | | | |
| 0 days | 50.0% | 49.9% | 49.8% | 49.8% |
| 120 days | <35% | 45.9% | 47.5% | 47.2% |
| 150 days | <35% | 43.0% | 46.2% | 45.1% |

TABLE 3

Improvement of storage stability of 50% aqueous technical cyanamide solutions at an increased storage temperature of 40° C. by addition of a magnesium salt or of a mixture of magnesium salts in comparison with the stabilisation with n-propyl formate; pH before commencement of storage = 4.1

50% aqueous technical cyanamide solution (commercially available) (content of this solution before commencement of storage = 50.0%; adjustment of pH value before commencement of storage with dilute phosphoric acid)

| without addition (original solution) | with addn. of 0.25% n-propyl formate | with addn. of 0.4% $MgCl_2.6H_2O$ (= 0.06% $Mg^{++}$) | with addn. of 0.25% $MgCl_2.6H_2O$ + 0.25% $MgSO_4.7H_2O$ (= 0.055% $Mg^{++}$) | with addn. of 0.25% $MgCl_2.6H_2O$ + 0.25% $Mg(NO_3)_2.6H_2O$ (= 0.054% $Mg^{++}$) | with addn. of 0.3% $MgCl_2.6H_2O$ + 0.2% n-propyl formate |
|---|---|---|---|---|---|
| | cyanamide content after storage period of 45 days at 40° C. | | | | |
| <38% | 45.6% | 46.8% | 47.5% | 46.9% | 47% |

TABLE 4

Improved storage stability of an aqueous technical, commercially available cyanamide solution at 40° C. by addition of magnesium chloride, the appropriate pH values of the individual storage samples having been adjusted with dilute hydrochloride acid

| storage temperature =40° C. | without addn. (technical standard solution) at commencement of storage adjusted with hydrochloric acid to pH 3.5 | with addn. of 0.5% $MgCl_2.6H_2O$ (= 0.24% $MgCl_2$) at commencement of storage adjusted with hydrochloric acid to pH 3.5 | with addn. of 0.5% $MgCl_2.6H_2O$ (= 0.24% $MgCl_2$) at commencement of storage adjusted with hydrochloric acid to pH 3.0 | with addn. of 1% $MgCl_2.6H_2O$ at commencement of storage adjusted with hydrochloric acid to pH 3.5 |
|---|---|---|---|---|
| cyanamide content after a storage period of: | | | | |
| 0 days | 49.3% | 49.1% | 49.1% | 48.8% |
| 43 days | <30% | 46.6% | 46.1% | 45.3% |

TABLE 5

Comparison of the storage stability of aqueous cyanamide solutions at 30 and 40° C. which have been prepared by concentration of a 30% aqueous technical cyanamide solution ("dilute solution") with and without the addition of magnesium chloride on a rotary evaporator under a water-pump vacuum at 35° C. (addition of $MgCl_2.6H_2O$ before evaporation); the addition of n-propyl formate before concentration is not possible because of its volatility (b.p. 80.9° C.)

| storage samples | 47.4% cyanamide soln. without addn.; after concentration pH 4.0 adjusted with $H_3PO_4$ | 47.4% cyanamide soln. containing 0.24% $MgCl_2$ (added as $MgCl_2.6H_2O$ before concentration); after concentration pH 4.0 adjusted with $H_3PO_4$ | 56.6% cyanamide soln. without addn.; after concentration pH 4.0 adjusted with $H_3PO_4$ | 56.6% cyanamide soln. containing 0.24% $MgCl_2$ (added as $MgCl_2.6H_2O$ before concentration); after concentration pH 4.0 adjusted with $H_3PO_4$ |
|---|---|---|---|---|
| cyanamide content at 30° C. after | | | | |
| 0 days | 47.4% | 47.4% | 56.6% | 56.6% |
| 120 days | | | <40% | 53.0% |
| 150 days | <<35% | 45.1% | | |
| cyanamide content at 40° C. after | | | | |
| 0 days | 47.4% | 47.4% | 56.6% | 56.6% |
| 45 days | | | <45% | 53.7% |
| 65 days | <30% | 44.1% | | |

TABLE 6

Storage experiment at 30 and 40° C. with a 78% aqueous cyanamide solution which has been prepared by dissolving technically pure, crystalline cyanamide in water

| of storage storage samples | 78% solution of cyanamide in water: prepared by dissolving technical, crystalline cyanamide in water | | |
|---|---|---|---|
| | without addn.; at commencement at commencement of adjust pH to 3.8 with $H_3PO_4$ | with addn. of 0.25% n-propyl formate; (= 0.094% $MgCl_2$); storage adjust pH to 3.8 with $H_3PO_4$ | with addn. of 0.2% $MgCl_2.6H_2O$ at commencement of storage adjust pH to 3.8 with $H_3PO_4$ |
| cyanamide content with storage at 30° C. after | | | |
| 0 days | 78.3% | 78.1% | 78.1% |
| 85 days | <60% | 74.2% | 75.7% |
| cyanamide content with storage at 40° C. after | | | |
| 0 days | 78.3% | 78.1% | 78.1% |
| 33 days | <60% | 72.5% | 72.8% |

I claim:

1. A process for increasing the storage stability of an aqueous solution containing 20 to 80% by weight cyanamide, comprising mixing the aqueous cyanamide solution with 0.005 to 0.5% by weight of divalent magnesium cations, based on the cyanamide solution, in the form of at least one inorganic and/or organic magnesium salt.

2. The process of claim 1, wherein a commercially-available, already stabilized approximately 50% by weight aqueous cyanamide solution is mixed with 0.005 to 0.5% by weight of magnesium ions in the form of at least one inorganic and/or organic magnesium salt.

3. The process of claim 1, wherein the aqueous cyanamide solution is mixed with 0.04 to 0.06% by weight of magnesium ions in the form of at least one inorganic and/or organic magnesium salt.

4. The process of claim 1 wherein the aqueous cyanamide solution is mixed with 0.3 to 0.5% by weight magnesium chloride hexahydrate (0.14 to 0.23% by weight magnesium chloride) or with 0.4 to 0.6% by weight magnesium sulphate heptahydrate (0.2 to 0.3% by weight magnesium sulphate).

5. The process of claim 1 wherein a mixture of magnesium salts is used.

6. The process of claim 1 wherein the aqueous cyanamide solution, after the addition of the magnesium salt stabilizer, is adjusted with a mineral acid or with an organic acid to a pH value of from about 5 to 3.

7. The process of claim 6, wherein the pH value is adjusted to from 3.5 to 4.5.

8. The process of claim 1 wherein the aqueous cyanamide solution, before the addition of the magnesium salt stabilizer, is adjusted with a mineral acid or with an organic acid to a pH value of from about 5 to 3.

9. The process of claim 8, wherein the pH value is adjusted to from 3.8 to 4.5.

10. The process of claim 6 wherein the pH value is adjusted with phosphoric acid.